(12) United States Patent

Troutman et al.

(10) Patent No.: US 7,470,734 B2
(45) Date of Patent: Dec. 30, 2008

(54) FLAME RETARDANT COMPOSITIONS

(75) Inventors: Malisa V. Troutman, New York, NY (US); Ramanathan Ravichandran, Suffern, NY (US); Rangarajan Srinivsan, Loveland, OH (US); Roswell Easton King, Pleasantville, NY (US); Douglas Wayne Horsey, Briarcliff Manor, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 368 days.

(21) Appl. No.: 11/296,686

(22) Filed: Dec. 7, 2005

(65) Prior Publication Data

US 2006/0084731 A1    Apr. 20, 2006

Related U.S. Application Data

(63) Continuation of application No. 10/471,947, filed as application No. PCT/EP02/02706 on Mar. 12, 2002, now Pat. No. 7,084,196.

(60) Provisional application No. 60/277,222, filed on Mar. 20, 2001.

(51) Int. Cl.
*C08K 5/3415*  (2006.01)
*C08K 5/3432*  (2006.01)

(52) U.S. Cl. .................. 524/99; 524/102; 524/104; 524/105; 524/464; 524/465; 524/466; 524/467; 524/468; 524/469

(58) Field of Classification Search ........... 524/99–105, 524/126, 127, 140, 141, 409, 412, 416, 436, 524/437, 464–469
See application file for complete search history.

(56) References Cited

U.S. PATENT DOCUMENTS

| | | | | |
|---|---|---|---|---|
| 4,325,863 A | 4/1982 | Hinsken et al. | ............. | 624/111 |
| 4,338,244 A | 7/1982 | Hinsken et al. | ............. | 524/109 |
| 4,590,231 A | 5/1986 | Seltzer et al. | ............... | 524/100 |
| 4,612,393 A | 9/1986 | Ravichandran et al. | ..... | 564/300 |
| 4,649,221 A | 3/1987 | Ravichandran et al. | ..... | 564/300 |
| 4,666,962 A | 5/1987 | Ravichandran et al. | ....... | 524/99 |
| 4,666,963 A | 5/1987 | Ravichandran et al. | ..... | 524/101 |
| 4,668,721 A | 5/1987 | Seltzer et al. | ................. | 524/95 |
| 4,678,826 A | 7/1987 | Pastor et al. | ................. | 524/104 |
| 4,691,015 A | 9/1987 | Behrens et al. | ............. | 544/198 |
| 4,696,964 A | 9/1987 | Ravichandran | ............. | 524/236 |
| 4,703,073 A | 10/1987 | Winter et al. | ................. | 524/99 |
| 4,720,517 A | 1/1988 | Ravichandran et al. | ..... | 524/101 |
| 4,753,972 A | 6/1988 | Ravichandran | ............. | 524/131 |
| 4,757,102 A | 7/1988 | Ravichandran et al. | ....... | 524/95 |
| 4,760,179 A | 7/1988 | Ravichandran | ............. | 564/157 |
| 4,782,105 A | 11/1988 | Ravichandran et al. | ..... | 524/236 |
| 4,831,134 A | 5/1989 | Winter et al. | ................. | 540/524 |
| 4,876,300 A | 10/1989 | Seltzer et al. | ............... | 524/100 |
| 4,898,901 A | 2/1990 | Ravichandran et al. | ..... | 524/237 |
| 4,929,657 A | 5/1990 | Ravichandran | ............. | 524/196 |
| 5,006,577 A | 4/1991 | Behrens et al. | ............... | 524/95 |
| 5,019,285 A | 5/1991 | Evans et al. | ................. | 252/47.5 |
| 5,021,479 A | 6/1991 | Ravichandran et al. | ....... | 524/96 |
| 5,045,583 A | 9/1991 | Odorisio et al. | ............. | 524/236 |
| 5,057,563 A | 10/1991 | Ravichandran | ............. | 524/98 |
| 5,064,883 A | 11/1991 | Behrens et al. | ............... | 524/95 |
| 5,081,300 A | 1/1992 | Odorisio et al. | ............. | 564/297 |
| 5,162,408 A | 11/1992 | Odorisio et al. | ............. | 524/236 |
| 5,175,312 A | 12/1992 | Dubs et al. | ................. | 549/307 |
| 5,185,448 A | 2/1993 | Odorisio et al. | ............. | 546/186 |
| 5,216,052 A | 6/1993 | Nesvadba et al. | ........... | 524/108 |
| 5,235,056 A | 8/1993 | Cunkle et al. | ............... | 546/187 |
| 5,252,643 A | 10/1993 | Nesvadba | .................... | 524/111 |
| 5,326,805 A | 7/1994 | Sicken et al. | ................. | 524/101 |
| 5,356,966 A | 10/1994 | Nesvadba | .................... | 524/111 |
| 5,367,008 A | 11/1994 | Nesvadba | .................... | 524/111 |
| 5,369,159 A | 11/1994 | Nesvadba | .................... | 524/111 |
| 5,393,812 A | 2/1995 | Haley et al. | ................. | 524/91 |
| 5,428,162 A | 6/1995 | Nesvadba | .................... | 544/221 |
| 5,428,177 A | 6/1995 | Nesvadba | .................... | 549/304 |
| 5,488,117 A | 1/1996 | Nesvadba | .................... | 549/302 |
| 5,516,920 A | 5/1996 | Nesvadba et al. | ........... | 549/307 |
| 5,583,247 A | 12/1996 | Nesvadba et al. | ............. | 560/2 |
| 5,614,572 A | 3/1997 | Nesvadba et al. | ........... | 524/111 |
| 5,616,774 A | 4/1997 | Evans et al. | .................... | 560/4 |
| 5,670,692 A | 9/1997 | Nesvadba et al. | ............. | 558/71 |
| 5,750,765 A | 5/1998 | Nesvadba et al. | ........... | 560/126 |
| 5,844,029 A | 12/1998 | Prabhu et al. | ............... | 524/236 |

(Continued)

FOREIGN PATENT DOCUMENTS

EP            0792911         9/1997

(Continued)

*Primary Examiner*—Peter Szekely
(74) *Attorney, Agent, or Firm*—Tyler A. Stevenson

(57) ABSTRACT

Polymeric substrates, for example polyolefins such as polypropylene, can be made flame retardant by the incorporation therein of a synergistic mixture of (i.) at least one compound selected from the group consisting of nitroxyl stabilizers, hydroxylamine stabilizers, nitrone stabilizers, substituted hydroxylamine stabilizers, amine oxide stabilizers, benzofuranone stabilizers, phosphite and phosphonite stabilizers, quinone methide stabilizers and monoacrylate esters of 2,2'-alkylidenebisphenol stabilizers and (ii.) at least one compound selected from the group consisting of brominated flame retardants, phosphorus containing flame retardants and inorganic flame retardants such as ammonium polyphosphate or decabromodiphenyl oxide; wherein the amount of organic or inorganic flame retardant of component (ii.) required to achieve an acceptable level of flame retardancy is significantly reduced compared to that needed when component (i.) is not present.

13 Claims, No Drawings

U.S. PATENT DOCUMENTS

| | | | |
|---|---|---|---|
| 5,880,191 A | 3/1999 | Prabhu et al. | 524/236 |
| 5,883,165 A | 3/1999 | Kröhnke et al. | 524/111 |
| 5,992,794 A | 11/1999 | Rotman et al. | 244/17.17 |
| 6,117,995 A | 9/2000 | Zedda et al. | 544/207 |
| 6,228,911 B1 | 5/2001 | Gilg | 524/91 |
| 6,472,456 B1 | 10/2002 | Horsey et al. | 524/99 |
| 6,489,383 B1 | 12/2002 | Wood et al. | 524/91 |
| 6,599,963 B2 | 7/2003 | Horsey et al. | 524/100 |
| 6,610,765 B1 | 8/2003 | Pfaendner et al. | 524/108 |
| 6,664,317 B2 | 12/2003 | King, III | 524/99 |
| 6,800,678 B2 | 10/2004 | Horsey et al. | 524/100 |

FOREIGN PATENT DOCUMENTS

| | | |
|---|---|---|
| WO | 98/28361 | 7/1994 |
| WO | 99/00450 | 1/1999 |

FLAME RETARDANT COMPOSITIONS

This is a continuation of application Ser. No. 10/471,947, which is a 371 of PCT/EP02/02706, filed Mar. 12, 2002, now U.S. Pat. No. 7,084,196, which claims benefit of U.S. provisional application No. 60/277,222, filed Mar. 20, 2001, the contents of which applications are hereby incorporated by reference.

The instant invention pertains to a novel method of flame retarding a polymeric substrate by adding thereto an effective flame retarding amount of a mixture of a synergist compound and a known organic or inorganic flame retardant. The synergists are selected from the group consisting of the nitroxyl stabilizers, hydroxylamine stabilizers, nitrone stabilizers, substituted hydroxylamine stabilizers, amine oxide stabilizers, benzofuranone stabilizers, phosphite and phosphonite stabilizers, quinone methide stabilizers and monoacrylate esters of 2,2'-alkylidenebisphenol stabilizers.

BACKGROUND OF THE INVENTION

U.S. Pat. No. 5,393,812 describes polyolefin compositions which are made flame retardant by a combination of a halogenated hydrocarbyl phosphate or phosphonate ester flame retardant in combination with a alkoxyamine functional hindered amine, but there is no suggestion that the hindered amine itself is responsible for the flame retardancy, but rather that the hindered amine is preventing delustering and other undesirable effects from occurring in these polyolefin compositions.

European Application No. 0 792 911 A2, discloses that alkoxyamine functional hindered amines are effective when used to enhance the flame retarding efficacy of tris(trihalogenopentyl) phosphate flame retardants.

U.S. Pat. No. 6,117,995 discloses that certain N-alkoxy hindered amines may be used as flame retardants for organic polymers. Copending U.S. application Ser. No. 09/502,239, filed Nov. 3, 1999, and Ser. No. 09/714,717, filed Nov. 16, 2000, disclose the use of certain N-alkoxy hindered amines as flame retardants.

The flame retardant (FR) market today is comprised of products which function to interfere with the combustion process by chemical and/or physical means. Mechanistically these FRs have been proposed to function during combustion of an article in either the gas phase, the condensed phase or both. The organohalogens are proposed to generate halogen species (e.g. HX) which interferes in the gas phase with free radical organic "fuel" from the polymer substrate. Synergists are proposed to react with HX to form additional chemical species with interfere with combustion in the gas phase, such as reaction of antimony oxide with HX to form antimony halide and water vapor. Still other flame retardant classes are proposed to impart efficacy in the "condensed" phase such as forming a protective char layer on the polyester, or forming an intumescent or foaming on the polymer surface. The char or intumescent layer is thought either to prevent organic fuel from migrating from the polymer into the vapor phase where it can fuel combustion, or the char can act as a thermal shield to protect the underlying polymer article from thermally induced decomposition and generation of fuel. Phosphorus compound of various classes (e.g. halo- or non-halogenated) are an example. Further still, other classes of compounds are proposed to function in the condensed and/or vapor phase.

Metal hydrates or metal oxides are proposed to generate water vapor under thermal conditions, the water acting to dilute the fuel mix in the combustion zone and to remove heat from the flame zone via conversion of water to vapor. Alumina trihydrate, magnesium hydroxide or oxide, and other compounds are reported to function in this way.

These state of the art chemistries described above have various detrimental aspects in addition to the effective flame retarding attributes mentioned. Certain organobrominated compounds are under governmental scrutiny for the generation of toxic by-products during the production or combustion such as dioxanes from polybrominated diphenyl oxides. Certain metal-containing flame retardants, notably antimony oxides, are under scrutiny for worker exposure and toxicity reasons. Antimony oxides often contain trace amounts of arsenic compounds which are suspected carcinogens. Overall, a growing concern has arisen regarding the generation of smoke and toxic gases which are evolved from these flame retardants during a fire. While the classic FRs may be effective combustion suppressants, the toxic gases they form pose a threat to human exposure.

The instant invention alleviates some of the detrimental aspects of the current state of the art which the use of large amounts of commercial flame retardants pose. The present synergist compounds are non-halogenated and free of heavy metals, thus avoiding generation of corrosive HX gases and avoiding exposure to toxic metals. In some applications, the instant invention provides a direct replacement for current FR systems where the instant synergist compounds provide a complimentary enhancement or synergistic system (e.g. antimony oxide replacement in ABS) where good flame retardancy can be achieved by using less classic FR agent in the presence of the instant synergist compounds.

Hydroxylamine stabilizers are disclosed in U.S. Pat. Nos. 4,590,231, 4,612,393, 4,649,221, 4,668,721, 4,691,015, 4,696,964, 4,703,073, 4,720,517, 4,757,102, 4,782,105, 4,831,134, 4,876,300, 5,006,577, 5,019,285, 5,064,883, 5,185,448 and 5,235,056.

Nitrone stabilizers of component are described in U.S. Pat. No. 4,898,901.

U.S. Pat. Nos. 4,666,962, 4,666,963, 4,678,826, 4,753,972, 4,757,102, 4,760,179, 4,929,657, 5,057,563, 5,021,479, 5,045,583 and 5,185,448 disclose the use of various substituted hydroxylamine stabilizers towards the stabilization of organic materials.

U.S. Pat. Nos. 5,081,300, 5,162,408, 5,844,029, 5,880,191 and 5,922,794 disclose the use of saturated hydrocarbon amine oxides towards the stabilization of thermoplastic resins.

Benzofuranone stabilizers are disclosed for example in U.S. Pat. Nos. 4,325,863; 4,338,244; 5,175,312; 5,216,052; 5,252,643; 5,369,159; 5,488,117; 5,356,966; 5,367,008; 5,428,162; 5,428,177; 5,614,572; 5,883,165 and 5,516,920.

Quinone methide stabilizers are disclosed for example in U.S. Pat. Nos. 5,583,247, 5,616,774, 5,670,692 and 5,750,765.

O-alkenyl substituted hydroxylamine stabilizers are disclosed in U.S. Pat. No. 5,045,583.

Non-hindered alkoxyamine stabilizers are disclosed in U.S. Pat. No. 5,185,448.

DETAILED DISCLOSURE

The instant invention pertains to a flame retardant composition which comprises
(A) a polymer substrate, and
(B) an effective flame retarding amount of a synergistic mixture of
 (i.) at least one compound selected from the group consisting of
  (a) nitroxyl stabilizers,
  (b) hydroxylamine stabilizers,
  (c) nitrone stabilizers,
  (d) substituted hydroxylamine stabilizers,
  (e) amine oxide stabilizers,
  (f) benzofuranone stabilizers,
  (g) phosphite and phosphonite stabilizers,
  (h) quinone methide stabilizers and
  (j) monoacrylate esters of 2,2'-alkylidenebisphenol stabilizers and
 (ii.) at least one compound selected from the group consisting of brominated flame retardants, phosphorus containing flame retardants and inorganic flame retardants.

Component (a)

The nitroxyl stabilizers of component (a) useful in this invention have the generic structure

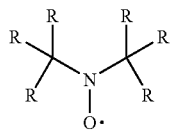

or are compounds that contain one or more groups of the formula

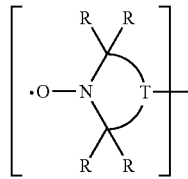

where each R is alkyl and T is a group required to complete a 5- or 6-membered ring.

Two or more nitroxyl groups may be present in the same molecule by being linked through the T moiety as exemplified below where E is a linking group.

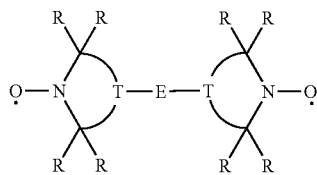

Typical nitroxyls of component (a) include bis(1-oxyl-2,2,6,6-tetramethylpiperidin-4-yl) sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, 1-oxyl-2,2,6,6-tetramethylpiperidin-4-one, 1-oxyl-2,2,6,6-tetramethylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl 4-t-butyl-benzoate, bis(1-oxyl-2,2,6,6-tetramethylpiperidin-4-yl) succinate, bis(1-oxyl-2,2,6,6-tetramethylpiperidin-4-yl) adipate, bis(1-oxyl-2,2,6,6-tetramethylpiperidin-4-yl) n-butylmalonate, bis(1-oxyl-2,2,6,6-tetramethylpiperidin-4-yl) phthalate, bis(1-oxyl-2,2,6,6-tetramethylpiperidin-4-yl) isophthalate, bis(1-oxyl-2,2,6,6-tetramethylpiperidin-4-yl) terephthalate, bis(1-oxyl-2,2,6,6-tetramethylpiperidin-4-yl) hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl)]-s-triazine, 4,4'-ethylenebis(1-oxyl-2,2,6,6-tetramethylpiperazin-3-one), 2-oxyl-1,1,3,3-tetramethyl-2-isobenzazole, 1-oxyl-2,2,5,5-tetramethylpyrrolidine, and N,N-bis-(1,1,3,3-tetramethylbutyl)nitroxide.

Nitroxyl stabilizers of component (a) are for example bis(1-oxyl-2,2,6,6-tetramethylpiperidin-4-yl) sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, and 1-oxyl-2,2,6,6-tetramethylpiperidin-4-one.

A specific embodiment is where the nitroxyl stabilizers of component (a) are bis(1-oxyl-2,2,6,6-tetramethylpiperidin-4-yl) sebacate and 4-hydroxy-1-oxyl-2,2,6,6-tetramethylpiperidine.

Component (b)

Hydroxylamine stabilizers of component (b) are for example those disclosed in U.S. Pat. Nos. 4,590,231, 4,612,393, 4,649,221, 4,668,721, 4,691,015, 4,696,964, 4,703,073, 4,720,517, 4,757,102, 4,782,105, 4,831,134, 4,876,300, 5,006,577, 5,019,285, 5,064,883, 5,185,448 and 5,235,056, the relevant parts of which are incorporated herein by reference.

The hydroxylamine stabilizers of component (b) employed in the novel compositions and methods are for example of the formula (I)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms; and $T_2$ is hydrogen, or independently has the same meaning as $T_1$.

Alternatively, the hydroxylamine stabilizers of component (b) of the present invention are compounds that contain one or more of the groups of the formula (II)

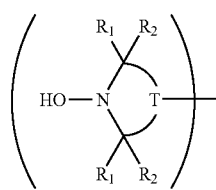

(II)

wherein

T is a group forming a five- or six-membered ring; and $R_1$ and $R_2$ are independently hydrogen, alkyl of 1 to 4 carbon atoms or phenyl.

In the present invention the compounds of component (b) are, for example, N,N-dihydrocarbylhydroxylamines of formula (I) wherein $T_1$ and $T_2$ are independently benzyl, methyl, ethyl, octyl, lauryl, dodecyl, tetradecyl, hexadecyl, heptadecyl or octadecyl, or wherein $T_1$ and $T_2$ are each the alkyl mixture found in hydrogenated tallow amine.

The compounds of component (b) in the present compositions and methods are, for example, N,N-dihydrocarbylhydroxylamines selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow)hydroxylamine.

Component (b) in the present invention may be for example the N,N-di(alkyl)hydroxylamine produced by the direct oxidation of N,N-di(hydrogenated tallow)amine (Irgastab® FS-042, Ciba Specialty Chemicals Corp.).

Component (c)

The nitrones of component (c) may be for example as described in U.S. Pat. No. 4,898,901, which is hereby incorporated by reference.

The nitrones of component (c) are for example of the formula (III)

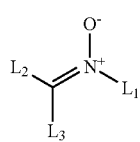

(III)

wherein $L_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

$L_2$ and $L_3$ are independently hydrogen, straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

or $L_1$ and $L_2$ together form a five- or six-membered ring including the nitrogen atom.

The nitrones of component (c) may be the corresponding oxidation products of the hydroxylamines of component (b). That is to say, the nitrones of component (c) may be nitrone analogues of the hydroxylamines of component (b). The nitrones may be for example, N-benzyl-α-phenylnitrone, N-ethyl-α-methylnitrone, N-octyl-α-heptylnitrone, N-lauryl-α-undecyinitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-di(hydrogenated tallow)hydroxylamine.

Component (d)

The substituted hydroxylamine stabilizers of component (d) are for example those described in U.S. Pat. Nos. 4,666,962, 4,666,963, 4,678,826, 4,753,972, 4,757,102, 4,760,179, 4,929,657, 5,057,563, 5,021,479, 5,045,583 and 5,185,448 the disclosures of which are hereby incorporated by reference. Component (d) includes the Michael addition products from the reaction of the hydroxylamines of component (b) with any α,β-unsaturated ketone, ester, amide, or phosphonate. Component (d) also includes Mannich-type condensation products from the reaction of the hydroxylamines of component (b) with formaldehyde and secondary amines. Component (d) also includes O-alkenyl substituted analogues of the present hydroxylamines of component (b) as disclosed in U.S. Pat. No. 5,045,583. Component (d) also includes non-hindered substituted hydroxylamine stabilizers as disclosed in U.S. Pat. No. 5,185,448. Component (d) also includes acyl derivatives of the hydroxylamine stabilizers of component (b), for example such as those disclosed in U.S. Pat. No. 5,021,479.

The substituted hydroxylamines of component (d) may be derivatives of the above-described hydroxylamines of formulae (I) and (II), provided that if they are derivatives of hydroxylamines of formula (II), that they are limited to derivatives of hydroxylamines as described in U.S. Pat. Nos. 5,185,448 and 5,235,056.

The present substituted hydroxylamines may be for example of the formula (IIIb) or (IIIa)

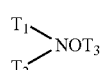

(IIIb)

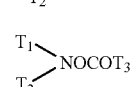

(IIIa)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms;

$T_2$ is hydrogen, or independently has the same meaning as $T_1$; and $T_3$ is allyl, straight or branched chain alkyl of 1 to 36 carbon atoms, cycloalkyl of 5 to 18 carbon atoms, cycloalkenyl of 5 to 18 carbon atoms or a straight or branched chain alkyl of 1 to 4 carbon atoms substituted by phenyl or by phenyl substituted by one or two alkyl groups of 1 to 4 carbon atoms or by 1 or 2 halogen atoms.

The substituted hydroxylamines of component (d) may be for example O-allyl-N,N-dioctadecylhydroxylamine or O-n-propyl-N,N-dioctadecylhydroxylamine or N,N-di(hydrogenated tallow)acetoxyamine.

The compounds of component (d) include the following general structures:

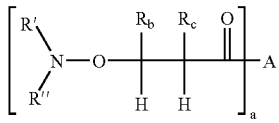 (IV)

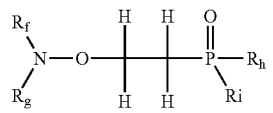 (V)

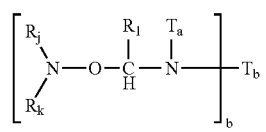 (VI)

wherein in the compounds of formula (IV)

a is 1 to 4;

R' and R'' are independently hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms, $R_b$ and $R_c$ are independently hydrogen or alkyl of 1 to 12 carbon atoms;

A, when a=1, is a group $NHR_d$, wherein $R_d$ is hydrogen, amino, alkyl of 1 to 18 carbon atoms or

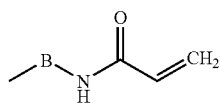

where B is a direct bond or alkylene of 1 to 10 carbon atoms;

A, when a=2, is a bivalent radical of a 5-7 membered heterocyclic compound containing two nitrogen atoms in the ring, with the free valencies on the nitrogen atoms, or is a group —N($R_d$)—B—N($R_d$)— where B and $R_d$ have the meanings given above;

A, when a=3, is a group of the formula

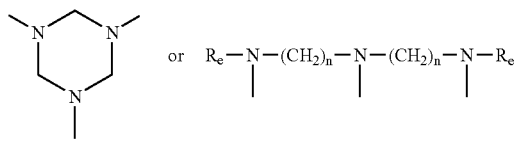

where n is 2 to 6 and $R_e$ is hydrogen or alkyl of 1 to 4 carbon atoms; and

A, when a=4, is a group of the formula

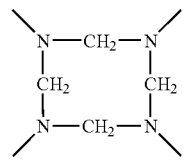

or

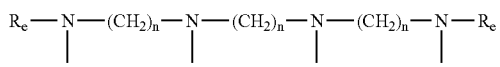

where $R_e$ and n have the meanings given above.

The R' and R'' groups are for example hydrogen, straight-chain or branched alkyl with 1 to 18 carbon atoms such as methyl, ethyl, n-propyl, n-butyl, tert-butyl, n-pentyl, n-octyl, 2-ethylhexyl, decyl, dodecyl and octadecyl; cyclopentyl and cyclohexyl; and benzyl, α-methylbenzyl and α,α-dimethylbenzyl. A specific embodiment is where $R_b$ and $R_c$ are hydrogen or alkyl of 1 to 4 carbon atoms.

Other specific groups include, for a=1, $R_d$ as $C_1$-$C_{18}$ alkyl (see list for R' and R'') and B as $C_1$-$C_6$ alkylene; for a=2, A as

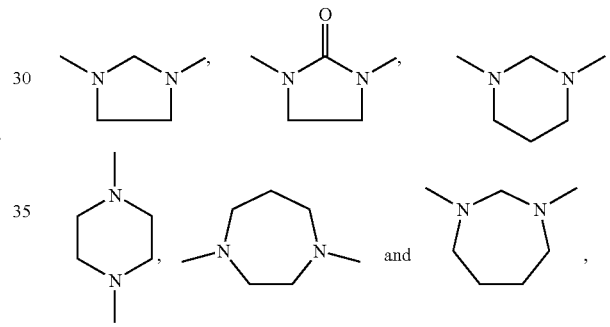

$R_d$ as hydrogen and B as straight chain $C_1$-$C_6$ alkylene; and for a=3, A as

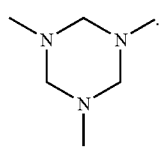

In compounds of formula (V), $R_f$, $R_g$, $R_h$ and $R_i$ independently are hydrogen, alkyl of 1 to 36 carbon atoms, cycloalkyl of 5 to 12 carbon atoms, aralkyl of 7 to 9 carbon atoms or said aralkyl substituted by alkyl of 1 to 36 carbon atoms; and the alkali metal and alkaline earth metal salts thereof.

Specific embodiments of the $R_f$-$R_i$ groups are where they are independently straight-chain or branched alkyl with 1 to 18 carbon atoms, for instance with 1 to 12 carbon atoms such as methyl, ethyl, n-propyl, n-butyl, tert-butyl, n-pentyl, n-octyl, 2-ethylhexyl, decyl, dodecyl, tetradecyl and octadecyl; cyclopentyl and cyclohexyl; and benzyl, α-methylbenzyl and α,α-dimethylbenzyl. Another specific embodiment are compounds having $R_f$ and $R_g$ as benzyl and $R_h$ and $R_i$ as alkyl of 1 to 8 carbon atoms. Typical salts include the sodium, potassium, calcium and magnesium salts.

In compounds of formula (VI), $R_j$ and $R_k$ are independently alkyl of 1 to 36 carbon atoms, cycloalkyl of 5 to 12 carbon atoms, aralkyl of 7 to 9 carbon atoms or said aralkyl substituted by alkyl of 1 to 36 carbon atoms, or $R_j$ and $R_k$ together with the nitrogen can form a 5-7 member heterocyclic ring, or $R_j$ and $R_k$ are independently a group of the formula

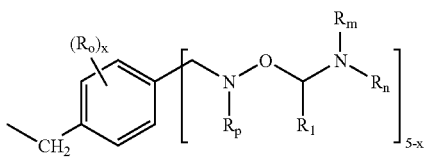

$R_l$, $R_m$, $R_n$, $R_o$ and $R_p$ are independently hydrogen, alkyl of 1 to 36 carbon atoms, cycloalkyl of 5 to 12 carbon atoms, allyl, aryl, aralkyl of 7 to 9 carbon atoms, said aralkyl substituted by alkyl of 1 to 36 carbon atoms, bornyl, norbornyl or isobornyl, or $R_m$ and $R_n$ together with nitrogen can form a 5-7 member heterocyclic ring;

b is 1-4;

x is 0-5;

$T_a$ is $R_l$ or —CH($R_l$)—O—N($R_j$)($R_k$);

when b=1, $T_b$ is $R_l$ or 5-7 member unsaturated heterocyclic-substituted ($C_1$-$C_4$)alkyl, or $T_a$ and $T_b$ together with the nitrogen can form a 5-7 member saturated heterocyclic ring;

when b=2, $T_b$ is alkylene of 2 to 12 carbon atoms, cycloalkylene of 6 to 10 carbon atoms, arylene of 6 to 10 carbon atoms or alkylenearylenealkylene of 8 to 10 carbon atoms or $T_a$ and $T_b$ together with the two nitrogens can form a 5-7 member saturated heterocyclic ring;

when b=3, $T_b$ is alkanetriyl of 3 to 6 carbon atoms or $T_a$ and $T_b$ together with the three nitrogens can form a 5-6 member saturated heterocyclic ring; and when b=4, $T_b$ is alkanetetriyl of 4 to 6 carbon atoms.

Representative $R_j$-$R_p$ groups are straight-chain or branched alkyl with 1 to 18 carbon atoms such as methyl, ethyl, n-propyl, n-butyl, tert-butyl, n-pentyl, n-octyl, 2-ethylhexyl, decyl, dodecyl and octadecyl; cyclopentyl or cyclohexyl; and benzyl, α-methylbenzyl and α,α-dimethylbenzyl. Specific embodiments are where $R_j$ and $R_k$ as benzyl or substituted benzyl and $R_l$ as hydrogen. $R_j/R_k$ and $R_m/R_n$ heterocyclic groups include piperidyl, pyrryl, morpholino or pyrrolidino. $T_a$ is for example one of the above noted $R_j$-$R_p$ representative groups or the substituted aminoxy group, while $T_b$ when b=1, may also be one of the above noted $R_j$-$R_p$ representative groups or pyridin-2-yl alkyl. $T_a/T_b$ (b=1) includes pyrrolidino, piperidyl and morpholino. $T_b$ when b=2 is, for example, ethylene, propylene, hexamethylene, phenylene and xylylene, and $T_a/T_b$ heterocyclic is for example, piperazine or pyrazolidine. $T_b$ when b=3 is, for example, trimethylylpropane and $T_a/T_b$ heterocyclic is fully saturated triazine or triazole. $T_b$ when b=4 is, for example, pentaerythrityl.

Typical b=2 and 3 heterocyclic compounds are

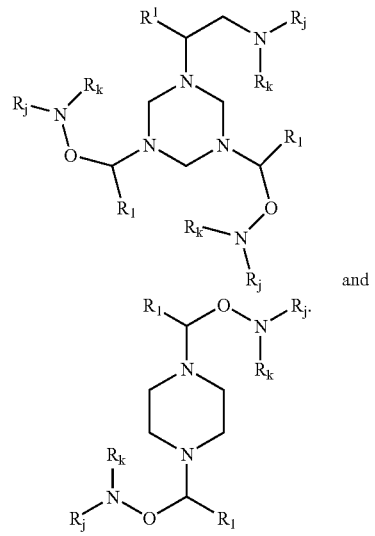

and

A specific example of a compound of formula (V) is diethyl (N,N-dioctadecylaminoxy)ethyl phosphonate.

Component (e)

The amine oxide stabilizers of component (e) are for example those disclosed in U.S. Pat. Nos. 5,081,300, 5,162,408, 5,844,029, 5,880,191 and 5,922,794, the relevant parts of each incorporated herein by reference.

The amine oxide stabilizers of component (e) are for example saturated tertiary amine oxides as represented by general formula (VII):

wherein $G_1$ and $G_2$ are independently a straight or branched chain alkyl of 6 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms;

$G_3$ is a straight or branched chain alkyl of 1 to 36 carbon atoms, aryl of 6 to 12 carbon atoms, aralkyl of 7 to 36 carbon atoms, alkaryl of 7 to 36 carbon atoms, cycloalkyl of 5 to 36 carbon atoms, alkcycloalkyl of 6 to 36 carbon atoms or cycloalkylalkyl of 6 to 36 carbon atoms; and wherein said aryl groups may be substituted by one to three halogen, alkyl of 1 to 8 carbon atoms, alkoxy of 1 to 8 carbon atoms or combinations thereof; and wherein said alkyl, aralkyl, alkaryl, cycloalkyl, alkcycloalkyl and cycloalkylalkyl groups may be interrupted by —O—, —S—, —SO—, —SO$_2$—, —COO—, —OCO—, —CO—, —NG$_4$-, —CONG$_4$- and —NG$_4$CO— groups, or wherein said alkyl, aralkyl, alkaryl, cycloalkyl, alkcycloalkyl and cycloalkylalkyl groups may be substituted by —OG$_4$, —SG$_4$, —COOG$_4$, —OCOG$_4$, —COG$_4$, —N(G$_4$)$_2$, —CON(G$_4$)$_2$, —NG$_4$COG$_4$ and 5- and 6-membered rings containing the —C(CH$_3$)(CH$_2$R$_x$)NL(CH$_2$R$_x$)(CH$_3$)C— group or wherein said alkyl, aralkyl, alkaryl, cycloalkyl, alkcycloalkyl and cycloalkylalkyl groups are both interrupted and substituted by the groups mentioned above; and
wherein $G_4$ is independently hydrogen or alkyl of 1 to 8 carbon atoms;

$R_x$ is hydrogen or methyl;

L is hydrogen, hydroxy, $C_{1-30}$ straight or branched chain alkyl moiety, a —C(O)R moiety where R is a $C_{1-30}$ straight or branched chain alkyl group, or a —$OR_y$ moiety; and $R_y$ is $C_{1-30}$ straight or branched chain alkyl, $C_2$-$C_{30}$ alkenyl, $C_2$-$C_{30}$ alkynyl, $C_5$-$C_{12}$ cycloalkyl, $C_5$-$C_{10}$ bicycloalkyl, $C_5$-$C_8$ cycloalkenyl, $C_6$-$C_{10}$ aryl, $C_7$-$C_9$ aralkyl, $C_7$-$C_9$ aralkyl substituted by alkyl or aryl, or —CO(D), where D is $C_1$-$C_{18}$ alkyl, $C_1$-$C_{18}$ alkoxy, phenyl, phenyl substituted by hydroxy, alkyl or alkoxy, or amino or amino mono- or di-substituted by alkyl or phenyl.

Within compounds of the formula (VII), at least one of $G_1$, $G_2$ and $G_3$ contains a β-carbon-hydrogen bond, i.e. a carbon-hydrogen bond on the second carbon atom from the nitrogen.

The number of substituents or interrupting groups in $G_1$, $G_2$ or $G_3$ as alkyl, aralkyl, alkaryl, cycloalkyl, alkcycloalkyl and cycloalkylalkyl defined above, if present, are from one to sixteen, within the limits given.

Examples of structures of formula (VII) are where $G_1$ and $G_2$ are independently benzyl or substituted benzyl. It is also possible for each of $G_1$, $G_2$, and $G_3$ to be the same residue. $G_1$ and $G_2$ may also independently be alkyl groups of 8 to 26 carbon atoms, for example alkyl groups of 10 to 26 carbon atoms. $G_3$ may be an alkyl group of 1 to 22 carbon atoms, for example methyl or substituted methyl. Also, the present amine oxides include those wherein $G_1$, $G_2$, and $G_3$ are the same alkyl groups of 6 to 36-carbon atoms. The aforementioned residues for $G_1$, $G_2$, and $G_3$ are, for instance, saturated hydrocarbon residues or saturated hydrocarbon residues containing at least one of the aforementioned —O—, —S—, —SO—, —$CO_2$—, —CO—, or —CON— moieties. Those skilled in the art will be able to envision other useful residues for each of $G_1$, $G_2$, and $G_3$ without detracting from the present invention.

The saturated amine oxides of component (e) may also includes poly(amine oxides). By poly(amine oxides) is meant tertiary amine oxides containing at least two tertiary amine oxides per molecule. Illustrative poly(amine oxides), also called "poly(tertiary amine oxides)", include the tertiary amine oxide analogues of aliphatic and alicyclic diamines such as, for example, 1,4-diaminobutane; 1,6-diaminohexane; 1,10-diaminodecane; and 1,4-diaminocyclohexane, and aromatic based diamines such as, for example, diamino anthraquinones and diaminoanisoles.

Also included as component (e) are tertiary amine oxides derived from oligomers and polymers of the aforementioned diamines. Useful amine oxides also include amine oxides attached to polymers, for example, polyolefins, polyacrylates, polyesters, polyamides, polystyrenes, and the like. When the amine oxide is attached to a polymer, the average number of amine oxides per polymer can vary widely as not all polymer chains need to contain an amine oxide. All of the aforementioned amine oxides may optionally contain at least one —O—, —S—, —SO—, —$CO_2$—, —CO—, or —$CONG_4$- moiety. For instance, each tertiary amine oxide of the polymeric tertiary amine oxide may contain a $C_1$ residue.

The groups $G_1$, $G_2$ and $G_3$ of formula (VII) may be attached to a molecule containing a hindered amine. Hindered amines are known in the art and the amine oxide of the present invention may be attached to the hindered amine in any manner and structural position of the hindered amine. Useful hindered amines when part of a compound of component (e) include those of the general formulas:

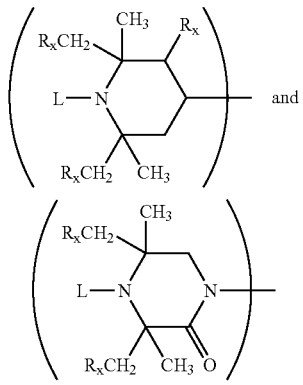

wherein L and $R_x$ are as described above. Also included are amine oxides containing more than one hindered amine and more than one saturated amine oxide per molecule. The hindered amine may be attached to a poly(tertiary amine oxide) or attached to a polymeric substrate, as discussed above.

Component (f)

The benzofuranone stabilizers of component (f) are those disclosed for example in U.S. Pat. Nos. 4,325,863; 4,338,244; 5,175,312; 5,216,052; 5,252,643; 5,369,159; 5,488,117; 5,356,966; 5,367,008; 5,428,162; 5,428,177; 5,614,572; 5,883,165 or 5,516,920, all incorporated herein by reference, or 3-(4-(2-acetoxyethoxy)phenyl)-5,7-di-tert-butyl-benzofuran-2-one, 5,7-di-tert-butyl-3-(4-(2-stearoyloxyethoxy)phenyl)benzofuran-2-one, 3,3'-bis(5,7-di-tert-butyl-3-(4-(2-hydroxyethoxy)phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

For example, component (f is one or more benzofuranone stabilizers selected from:

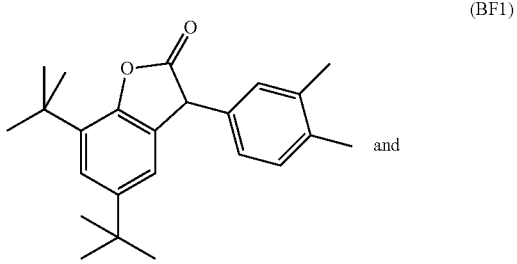

(BF1)

and

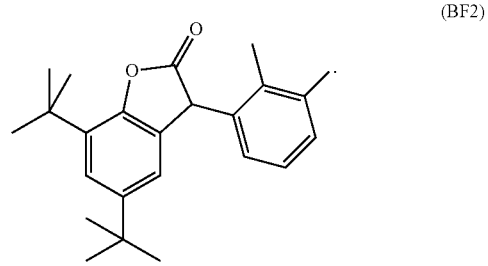

(BF2)

Component (g)

Component (g) is at least one compound selected from the formulae (1), (2), (3), (4), (5), (6) and (7)

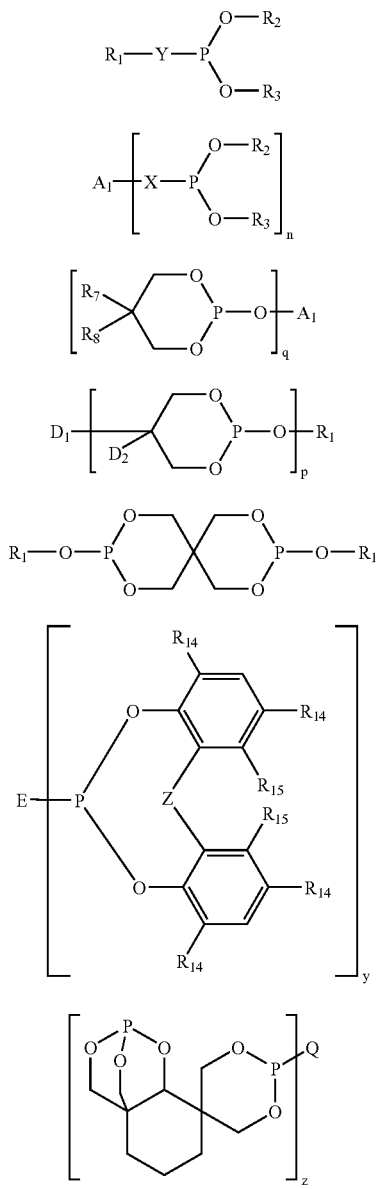

in which the indices are integral and n is 2, 3 or 4; p is 1 or 2; q is 2 or 3; r is 4 to 12; y is 1, 2 or 3; and z is 1 to 6;

$A_1$, if n is 2, is $C_2$-$C_{18}$ alkylene; $C_2$-$C_{12}$ alkylene interrupted by oxygen, sulfur or —$NR_4$—; a radical of the formula

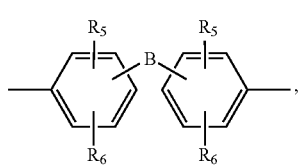

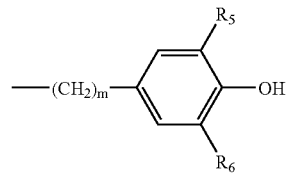

phenylene;

$A_1$, if n is 3, is a radical of the formula —$C_rH_{2r-1}$—;

$A_1$, if n is 4, is $$—CH_2—\underset{\underset{CH_2}{|}}{\overset{\overset{CH_2—}{|}}{C}}—CH_2—;$$

$A_2$ is as defined for $A_1$ if n is 2;

B is a direct bond, —$CH_2$—, —$CHR_4$—, —$CR_1R_4$—, sulfur, $C_5$-$C_7$ cycloalkylidene, or cyclohexylidene which is substituted by from 1 to 4 $C_1$-$C_4$ alkyl radicals in position 3, 4 and/or 5;

$D_1$, if p is 1, is $C_1$-$C_4$ alkyl and, if p is 2, is —$CH_2OCH_2$—;

$D_2$, if p is 1, is $C_1$-$C_4$ alkyl;

E, if y is 1, is $C_1$-$C_{18}$ alkyl, —$OR_1$ or halogen;

E, if y is 2, is —O-$A_2$-O—,

E, if y is 3, is a radical of the formula $R_4C(CH_2O—)_3$ or $N(CH_2CH_2O—)_3$;

Q is the radical of an at least z-valent alcohol or phenol, this radical being attached via the oxygen atom to the phosphorus atom;

$R_1$, $R_2$ and $R_3$ independently of one another are $C_1$-$C_{18}$ alkyl which is unsubstituted or substituted by halogen, —$COOR_4$, —CN or —$CONR_4R_4$; $C_2$-$C_{18}$ alkyl interrupted by oxygen, sulfur or —$NR_4$—; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula

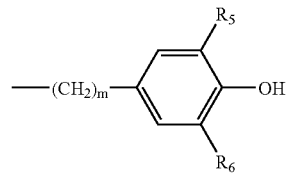

in which m is an integer from the range 3 to 6;

$R_4$ is hydrogen, $C_1$-$C_{18}$ alkyl, $C_5$-$C_{12}$ cycloalkyl or $C_7$-$C_9$ phenylalkyl, $R_5$ and $R_6$ independently of one another are hydrogen, $C_1$-$C_8$ alkyl or $C_5$-$C_6$ cycloalkyl, $R_7$ and $R_8$, if q is 2, independently of one another are $C_1$-$C_4$ alkyl or together are a 2,3-dehydropentamethylene radical; and $R_7$ and $R_8$, if q is 3, are methyl;

$R_{14}$ is hydrogen, $C_1$-$C_9$ alkyl or cyclohexyl, $R_{15}$ is hydrogen or methyl and, if two or more radicals $R_{14}$ and $R_{15}$ are present, these radicals are identical or different, X and Y are each a direct bond or oxygen, Z is a direct bond, methylene, —$C(R_{16})_2$— or sulfur, and $R_{16}$ is $C_1$-$C_8$ alkyl.

Of interest are compositions and methods wherein component (g) is at least one compound selected from the formulae (1), (2), (5) and (6), in which n is the number 2, and y is the number 1, 2 or 3;

$A_1$ is $C_2$-$C_{18}$alkylene, p-phenylene or p-biphenylene,

E, if y is 1, is $C_1$-$C_{18}$ alkyl, —$OR_1$ or fluorine;

E, if y is 2, is p-biphenylene,

E, if y is 3, is $N(CH_2CH_2O—)_3$, $R_1$, $R_2$ and $R_3$ independently of one another are $C_1$-$C_{18}$ alkyl, $C_7$-$C_9$ phenylalkyl, cyclohexyl, phenyl, or phenyl substituted by 1 to 3 alkyl radicals having a total of 1 to 18 carbon atoms;

$R_{14}$ is hydrogen or $C_1$-$C_9$ alkyl, $R_{15}$ is hydrogen or methyl;

X is a direct bond,

Y is oxygen,

Z is a direct bond or —$CH(R_{16})$—, and $R_{16}$ is $C_1$-$C_4$alkyl.

Likewise of interest are compositions and methods wherein component (g) is at least one compound selected from the formulae (1), (2), (5) and (6), in which n is the number 2 and y is the number 1 or 3;

$A_1$ is p-biphenylene,

E, if y is 1, is $C_1$-$C_{18}$alkoxy or fluorine,

E, if y is 3, is $N(CH_2CH_2O—)_3$, $R_1$, $R_2$ and $R_3$ independently of one another are $C_1$-$C_{18}$alkyl, or phenyl substituted by 2 or 3 alkyl radicals having a total of 2 to 12 carbon atoms;

$R_{14}$ is methyl or tert-butyl;

$R_{15}$ is hydrogen;

X is a direct bond;

Y is oxygen; and

Z is a direct bond, methylene or —$CH(CH_3)$—.

Component (g) in the present invention may be at least one compound selected from the formulae (1), (2) and (6).

Component (g) in the present invention may be at least one compound of the formula

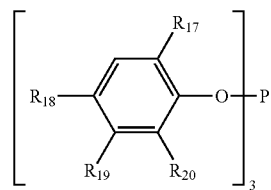

in which $R_{17}$ and $R_{18}$ independently of one another are hydrogen, $C_1$-$C_8$ alkyl, cyclohexyl or phenyl, and $R_{19}$ and $R_{20}$ independently of one another are hydrogen or $C_1$-$C_4$alkyl.

The following compounds are examples of organic phosphites and phosphonites which are suitable for use in component (g):

Triphenyl phosphite, diphenyl alkyl phosphites, phenyl dialkyl phosphites, tris(nonylphenyl) phosphite (TNPP®, GE), trilauryl phosphite, trioctadecyl phosphite, distearyl pentaerythritol diphosphite, tris(2,4-di-tert-butylphenyl) phosphite (Irgafos® 168, Ciba Specialty Chemicals Corp.), diisodecyl pentaerythritol diphosphite, bis(2,4-di-tert-butylphenyl) pentaerythritol diphosphite (formula (D)), bis(2,6-di-tert-butyl-4-methylphenyl) pentaerythritol diphosphite (formula (E)), bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, tetrakis (2,4-di-tert-butylphenyl) 4,4'-biphenylene-diphosphonite (Irgafos® P-EPQ, Ciba Specialty Chemicals Corp., formula (H)), 6-isooctyloxy-2,4,8,10-tetra-tert-butyl-dibenzo[d,f][1,3,2]dioxaphosphepin (formula (C)), 6-fluoro-2,4,8,10-tetra-tert-butyl-12-methyl-dibenzo[d,g][1,3,2]dioxaphosphocin (formula (A)), bis(2,4-di-tert-butyl-6-methylphenyl) methyl phosphite, bis(2,4-di-tert-butyl-6-methylphenyl) ethyl phosphite (formula (G)).

The following phosphites and phosphonites may be used in component (g) in the novel compositions and methods:

Tris(2,4-di-tert-butylphenyl) phosphite (Irgafos® 168, Ciba Specialty Chemicals Corp.), tris(nonylphenyl) phosphite (TNPP®, GE),

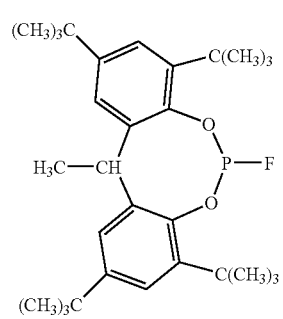

(A)

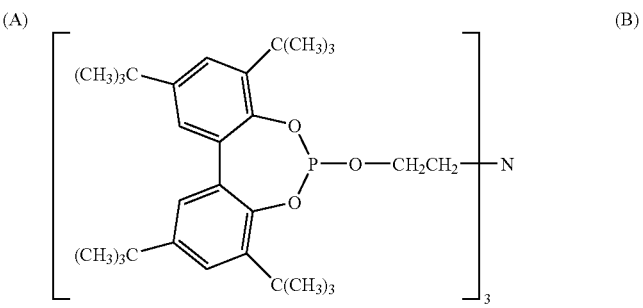

(B)

-continued
(C)
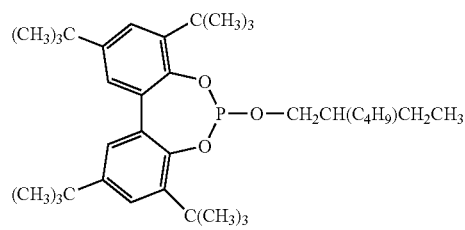
(D)
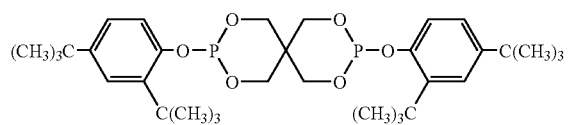
(E)
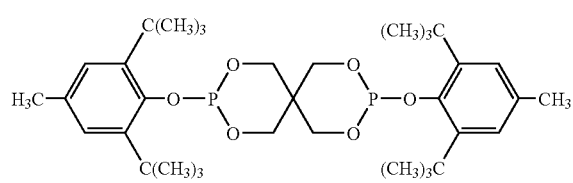
(F)
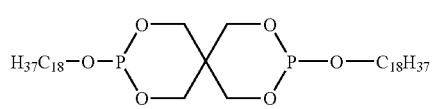
(G)
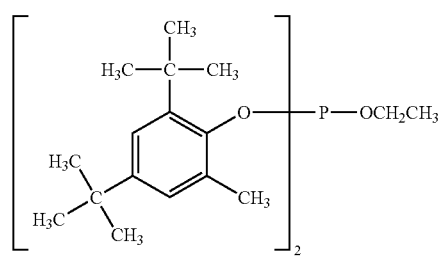
(H)
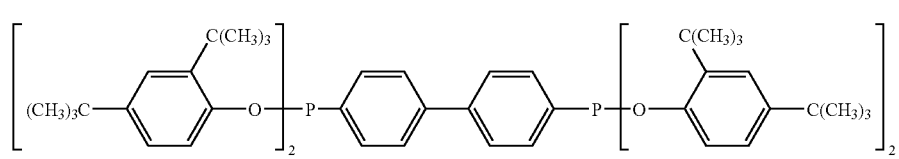
(J)
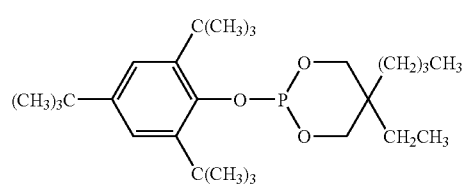
(K)
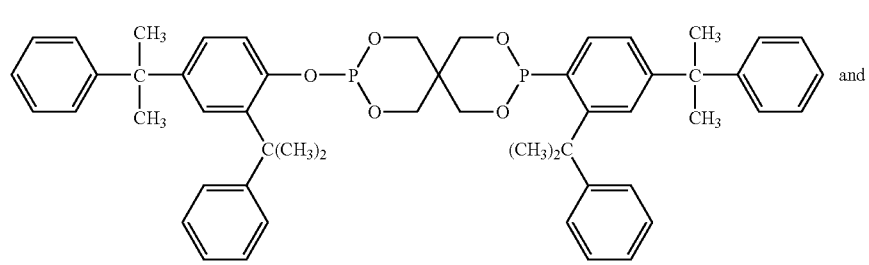
and

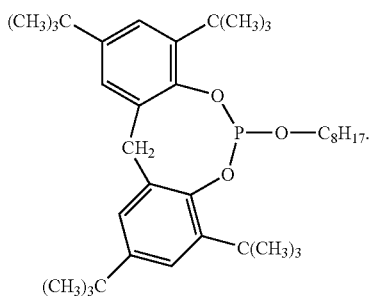

(L)

Component (g) in the novel compositions and methods of the present invention may for example be: Tris(2,4-di-tert-butylphenyl) phosphite (Irgafos® 168, Ciba Specialty Chemicals Corp.), 2,2'-ethylidenebis(2,4-di-tert-butylphenyl) fluorophosphite, (ETHANOX® 398, Ethyl Corp.), bis(2,4-di-tert-butyl-6-methylphenyl) ethyl phosphite (Irgafos® 38, Ciba Specialty Chemicals Corp., formula (G)), bis(2,4-di-tert-butylphenyl) pentaerythritol diphosphite (Ultranox® 626, GE Chemicals, formula (D)), tetrakis(2,4-di-tert-butylphenyl)4,4'-biphenylene-diphosphonite (Irgafos® P-EPQ, Ciba Specialty Chemicals Corp., formula (H)), 2,2',2"-nitrilo[triethyltris(3,3'5,5'-tetra-tert-butyl-1,1'-biphenyl-2,2'-diyl)phosphite] (Irgafos® 12, Ciba Specialty Chemicals Corp., formula (B)), Ultranox® 641 (GE Chemicals, formula (J)), Doverphos® S9228 (Dover Chemicals, formula (K)) or Mark® HP10 (Adeka Argus, formula (L)).

These organic phosphites and phosphonites are known compounds; many of them are commercially available.

Component (h)

The quinone methide stabilizers of component (h) of the present invention are those disclosed for example in U.S. Pat. Nos. 5,583,247, 5,616,774, 5,670,692 and 5,750,765, all incorporated herein by reference.

For example, the quinone methides of component (h) are of formula (VIII)

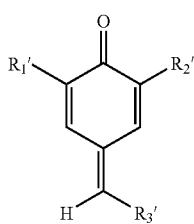

(VIII)

wherein $R_1'$ and $R_2'$ are independently straight or branched chain alkyl of 4 to 18 carbon atoms, cycloalkyl of 5 to 12 carbon atoms or phenylalkyl of 7 to 15 carbon atoms, and $R_3'$ is 2-, 3- or 4-pyridyl; 2- or 3-thienyl; 2- or 3-pyrryl; 2- or 3-furyl; aryl of 6 to 10 carbon atoms; or said aryl substituted by one to three alkyl of 1 to 8 carbon atoms, alkoxy of 1 to 8 carbon atoms, alkylthio of 1 to 8 carbon atoms, alkylamino of 1 to 8 carbon atoms, dialkylamino of 2 to 8 carbon atoms, alkoxycarbonyl of 2 to 8 carbon atoms, hydroxy, nitro, amino, cyano, carboxy, aminocarbonyl, chloro or mixtures of said substituents; or $R_3'$ is —CN, —COOH, —COOR$_4'$, —COR$_5'$, —OCOR$_6'$, —CONR$_7'R_6'$ or —PO(OR$_9'$)$_2$ where $R_4'$ is alkyl of 1 to 18 carbon atoms, cycloalkyl of 5 to 12 carbon atoms, phenyl or benzyl, $R_5'$ is alkyl of 1 to 18 carbon atoms, aryl of 6 to 10 carbon atoms or said aryl substituted by 1 or 2 alkyl of 1 to 4 carbon atoms or by hydroxyl, $R_6'$ is alkyl of 1 to 18 carbon atoms, aryl of 6 to 10 carbon atoms or said aryl substituted by 1 or 2 alkyl of 1 to 4 carbon atoms or by hydroxyl, $R_7'$ and $R_8'$ are independently hydrogen, alkyl of 1 to 18 carbon atoms or said alkyl substituted by alkylamino of 1 to 4 carbon atoms, by dialkylamino of 2 to 8 carbon atoms or by hydroxyl; benzyl, aryl of 6 to 10 carbon atoms or said aryl substituted by alkyl of 1 to 4 carbon atoms, by alkylamino of 1 to 4 carbon atoms, by dialkylamino of 2 to 8 carbon atoms, by phenylamino or by hydroxyl, or —NR$_7'R_8'$ is morpholino, piperidino or pyrrolidino, and $R_9'$ is hydrogen or alkyl of 1 to 18 carbon atoms.

For example, $R_1'$ and $R_2'$ are tert-butyl, tert-amyl, tert-octyl, cyclohexyl, α-methylbenzyl or α,α-dimethylbenzyl.

A specific embodiment is where $R_1'$ and $R_2'$ are tert-butyl, tert-amyl or tert-octyl.

In the compound of formula I, $R_3'$ is for example phenyl or phenyl substituted by nitro, cyano, dimethylamino, methoxy, alkyl of 1 to 4 carbon atoms, hydroxy or mixtures of said substituents; specific embodiments are where $R_3'$ is phenyl, or where $R_3'$ is —CN, —COOH, —COOR$_4'$, —COR$_5'$, —OCOR$_6'$, —CONR$_7'R_8'$ or —PO(OR$_9'$)$_2$ where $R_4'$ is alkyl of 1 to 8 carbon atoms, $R_5'$ is methyl or phenyl, $R_6'$ is alkyl of 1 to 18 carbon atoms or phenyl, $R_7'$ and $R_8'$ are independently hydrogen or alkyl of 1 to 18 carbon atoms, or —NR$_7'R_8'$ is morpholino or piperidino, and $R_9'$ is alkyl of 1 to 4 carbon atoms.

$R_3'$ is for instance —CN, —COOH, —COOR$_4'$, —COR$_5'$, —CONR$_7'R_5'$ or —PO(OR$_9'$)$_2$ where $R_4'$ is alkyl of 1 to 4 carbon atoms, $R_5'$ is methyl or phenyl, $R_7'$ and $R_8'$ are independently hydrogen or alkyl of 1 to 4 carbon atoms, or —NR$_7'R_8'$ is morpholino, and $R_9'$ is alkyl of 1 to 4 carbon atoms.

Specific examples of compounds of formula (VIII) are
(3,5-di-tert-butyl-4-oxocyclohexa-2,5-dienylidene)acetonitrile,
(3,5-di-tert-butyl-4-oxocyclohexa-2,5-dienylidene)acetic acid,
(3,5-di-tert-amyl-4-oxocyclohexa-2,5-dienylidene)acetic acid,
methyl (3,5-di-tert-butyl-4-oxocyclohexa-2,5-dienylidene) acetate, ethyl (3,5-di-tert-butyl-4-oxocyclohexa-2,5-dienylidene)acetate,
n-butyl (3,5-di-tert-butyl-4-oxocyclohexa-2,5-dienylidene)acetate,
2,6-di-tert-butyl-4-(2-oxopropylidene)-cyclohexa-2,5-dienone,
diethyl (3,5-di-tert-butyl-4-oxocyclohexa-2,5-dienylidene)methanephosphonate,
(3,5-di-tert-butyl-4-oxocyclohexa-2,5-dienylidene)methyl acetate,
(3,5-di-tert-butyl-4-oxocyclohexa-2,5-dienylidene)methyl pivalate,
(3,5-di-tert-butyl-4-oxocyclohexa-2,5-dienylidene)methyl benzoate, and
N,N-diethyl-2-(3,5-di-tert-butyl-4-oxocyclohexa-2,5-dienylidene)acetamide,
2,6-di-tert-butyl-4-benzylidene-cyclohexa-2,5-dienone,
2,6-di-tert-butyl-4-(4-nitrobenzylidene)-cyclohexa-2,5-dienone,
2,6-di-tert-butyl-4-(3-nitrobenzylidene)-cyclohexa-2,5-dienone,
2,6-di-tert-butyl-4-(4-cyanobenzylidene)-cyclohexa-2,5-dienone,
2,6-di-tert-butyl-4-(4-dimethylaminobenzylidene)-cyclohexa-2,5-dienone,
2,6-di-tert-amyl-4-benzylidene-cyclohexa-2,5-dienone,
2,6-di-tert-butyl-4-(4-methoxybenzylidene)-cyclohexa-2,5-dienone, and
2,6-di-tert-butyl-4-(3,5-di-tert-butyl-4-hydroxybenzylidene)-cyclohexa-2,5-dienone;
especially 2,6-di-tert-butyl-4-benzylidene-cyclohexa-2,5-dienone.

Component (j)

The monoacrylate esters of 2,2'-alkylidenebisphenol stabilizers are for example of the formula (IX)

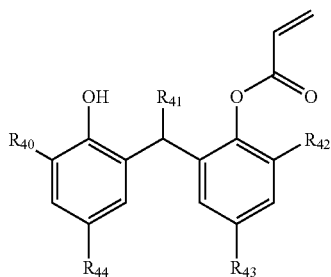

wherein $R_{40}$, $R_{41}$, $R_{42}$, and $R_{44}$ are independently straight or branched chain alkyl of 1 to 18 carbon atoms, cycloalkyl of 5 to 12 carbon atoms or phenylalkyl of 7 to 15 carbon atoms.

The present stabilizers of component (j) are for example monoacrylate esters of compounds selected from the group consisting of 2,2'-methylenebis(6-tert-butyl-4 methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 2,6-bis(3-tert-butyl-5-methyl-2-hydroxybenzyl)-4-methylphenol and 1,1-bis-(3,5-dimethyl-2-hydroxyphenyl)butane.

For example, component (j) may be the monoacrylate ester of 2,2'-methylenebis(6-tert-butyl-4-methylphenol), available from Ciba Specialty Chemicals as Irganox® 3052:

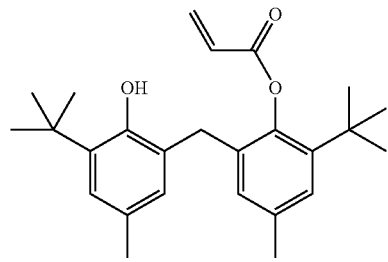

In the structures of the present compounds of component (i.) if any substituents are alkyl, they are for example methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl. Typical cycloalkyl groups include cyclopentyl and cyclohexyl; typical cycloalkenyl groups include cyclohexenyl; while typical aralkyl groups include benzyl, α-methyl-benzyl, α,α-dimethylbenzyl or phenethyl.

For example, component (i.) is at least one compound selected from the group consisting of
(a) bis(1-oxyl-2,2,6,6-tetramethylpiperidin-4-yl) sebacate and 4-hydroxy-1-oxyl-2,2,6,6-tetramethylpiperidine,
(b) an N,N-di(alkyl)hydroxylamine produced by the direct oxidation of N,N-di(hydrogenated tallow)amine (Irgastab® FS-042),
(c) N-octadecyl-α-heptadecyinitrone,
(d) O-n-propyl-N,N-dioctadecylhydroxylamine,
(e) Genox™ EP, a di($C_{15}$-$C_{18}$)alkyl methyl amine oxide, CAS# 204933-93-7,
(f) 3-(3,4-dimethylphenyl)-5,7-di-tert-butyl-benzofuran-2-one, Irganox® HP-136, (BF1),
(g) tris(2,4-di-tert-butylphenyl) phosphite (Irgafos® 168),
(h) 2,6-di-tert-butyl-4-benzylidene-cyclohexa-2,5-dienone (Prostab™ 6007) and
(j) the monoacrylate ester of 2,2'-methylenebis(6-tert-butyl-4-methylphenol), Irganox® 3052.

Irganox, Irgafos, Prostab and Irgastab are trademarks of Ciba Specialty Chemicals. Genox™ EP is available from GE Chemicals. N-octadecyl-α-heptadecyinitrone is as prepared in Example 3 of U.S. Pat. No. 4,898,901.

The polymeric substrate of component (A) is any of a wide variety of polymeric types including polyolefins, polystyrenics, and PVC. For example, the polymer substrate may be selected from the group of resins consisting of the polyolefins, the thermoplastic olefins, styrenic polymers and copolymers, ABS and polymers which contain hetero atoms, double bonds or aromatic rings. Specific embodiments are where component (A) is polypropylene, polyethylene, thermoplastic olefin (TPO), ABS or high impact polystyrene.

For example, the polymer substrate is selected from the group of resins consisting of the polyolefins, the thermoplastic olefins, styrenic polymers and copolymers, and ABS.

Another embodiment of the present invention is where the polymer substrate is selected from the group consisting of polypropylene, polyethylene, thermoplastic olefin (TPO), ABS and high impact polystyrene.

For instance, the polymer substrate is polypropylene, polyethylene or thermoplastic olefin (TPO).

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, for example polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

The effective flame retarding amount of component (B) is that needed to show flame retarding efficacy as measured by one of the standard methods used to assess flame retardancy. These include the NFPA 701 Standard Methods of Fire Tests for Flame-Resistant Textiles and Films, 1989 and 1996 editions; the UL 94 Test for Flammability of Plastic Materials for Parts in Devices and Appliances, 5th Edition, Oct. 29, 1996; Limiting Oxygen Index (LOI), ASTM D-2863; and Cone Calorimetry, ASTM E-1354.

In the synergistic mixture (B), component (i.) is present from about 0.25 to about 10% by weight based on component (A); for example from about 0.5 to about 8% by weight based on component (A); for example from about 0.5 to about 5% by weight based on component (A); for example from about 0.5 to about 2% by weight based on component (A); for example from 5.1% to about 10% by weight based on component (A); for example from 5.1% to about 8% based on component (A).

In the synergistic mixture (B), component (ii.) is present from about 0.25 to about 60% by weight based on component (A); for example from about 0.25 to about 30% by weight based on component (A); for example from about 0.5% to about 15% by weight based on component (A); for example from about 1% to about 10% by weight based on component (A); for example from about 1% to about 5% by weight based on component (A).

The flame retardant compounds of component (ii.) useful in the instant invention are for instance selected from the group consisting of tetraphenyl resorcinol diphosphite (FYROLFLEX® RDP, Akzo Nobel), chloroalkyl phosphate esters (ANTIBLAZE® AB-100, Albright & Wilson; FYROL® FR-2, Akzo Nobel)

polybrominated diphenyl oxide (DE-60F, Great Lakes Corp.)

decabromodiphenyl oxide (DBDPO; SAYTEX® 102E)

antimony trioxide ($Sb_2O_3$), antimony pentoxide ($Sb_2O_5$), tris[3-bromo-2,2-bis(bromomethyl)propyl] phosphate (PB 370®, FMC Corp.), triphenyl phosphate, bis(2,3-dibromopropyl ether) of bisphenol A (PE68), ammonium polyphosphate (APP) or (HOSTAFLAM® AP750), resorcinol diphosphate oligomer (RDP), brominated epoxy resin, ethylene-bis(tetrabromophthalimide) (SAYTEX® BT-93), bis(hexachlorocyclopentadieno)cyclooctane (DECLORANE PLUSH, calcium sulfate chlorinated paraffins, magnesium carbonate, melamine phosphates, melamine pyrophosphates, molybdenum trioxide, zinc oxide, 1,2-bis(tribromophenoxy)ethane (FF680), tetrabromo-bisphenol A (SAYTEX® RB100), magnesium hydroxide, alumina trihydrate, zinc borate, ethylenediamine diphosphate (EDAP)

silica, silicones, calcium silicate, magnesium silicate and ethylene bis-(dibromo-norbornanedicarboximide), (SAYTEX® BN-451).

Coadditives found useful for use with the instant compounds of components (a)-(j) in flame retardant compositions are as follows:

UV absorbers:
2-(2-hydroxy-3,5-di-α-cumylphenyl)-2H-benzotriazole, (TINUVIN® 234, Ciba Specialty Chemicals Corp.);
2-(2-hydroxy-5-methylphenyl)-2H-benzotriazole, (TINUVIN® P, Ciba Specialty Chemicals Corp.);
5-chloro-2-(2-hydroxy-3,5-di-tert-butylphenyl)-2H-benzotriazole, (TINUVIN® 327, Ciba Specialty Chemicals Corp.);
2-(2-hydroxy-3,5-di-tert-amylphenyl)-2H-benzotriazole, (TINUVIN® 328, Ciba Specialty Chemicals Corp.);
2-(2-hydroxy-3-α-cumyl-5-tert-octylphenyl)-2H-benzotriazole, (TINUVIN® 928, Ciba Specialty Chemicals Corp.);
2,4-di-tert-butylphenyl 3,5-di-tert-butyl-4-hydroxybenzoate, (TINUVIN® 120, Ciba Specialty Chemicals Corp.);
2-hydroxy-4-n-octyloxybenzophenone, (CHIMASSORB® 81, Ciba Specialty Chemicals Corp.);
2,4-bis(2,4-dimethyphenyl)-6-(2-hydroxy-4-octyloxyphenyl)-s-triazine, (CYASORB® 1164, Cytec).

It is contemplated that in addition to components (i.) and (ii.) of the present compositions, that hindered amines as disclosed in U.S. Pat. No. 6,117,995 and copending U.S. application Ser. No. 09/502,239, filed Nov. 3, 1999, and Ser. No. 09/714,717, filed Nov. 16, 2000, may also be present. The disclosures of this U.S. patent and applications are hereby incorporated by reference.

Certain compounds selected from components (a)-(j) are effective alone towards providing flame retardancy to plastic substrates, for example polyolefins, polystyrenics and PVC. In particular, compounds of component (d), certain substituted hydroxylamine stabilizers, are effective alone as flame retardants. In particular, O-n-propyl-N,N-dioctadecylhydroxylamine is an effective flame retardant alone, that is without the presence of known flame retardants such as brominated flame retardants, phosphorus containing flame retardants and inorganic flame retardants.

The following examples are meant for illustrative purposes only and are not to be construed to limit the scope of this invention in any manner whatsoever.

Test Methods

NFPA 701 Standard Methods of Fire Tests for Flame-Resistant Textiles and Films, 1989 and 1996 editions;
UL 94 Test for Flammability of Plastic Materials for Parts in Devices and Appliances, 5th Edition, Oct. 29, 1996;
Limiting Oxygen Index (LOI), ASTM D-2863;
Cone Calorimetry, ASTM E-1 or ASTM E 1354;
ASTM D 2633-82, burn test.

Test Compounds

NO.1 is bis(1-oxyl-2,2,6,6-tetramethylpiperidin-4-yl) sebacate, (Prostab™ 5415, Ciba Specialty Chemicals Corp.),
NOH-1 is bis(1-hydroxy-2,2,6,6-tetramethylpiperidin-4-yl) sebacate,
DBDPO is decabromodiphenyl oxide,
FR-1 is tris[3-bromo-2,2-bis(bromomethyl)propyl] phosphate, (PB 370®, FMC Corp.).
FR-2 is ammonium polyphosphate (APP).
FR-3 is bis(2,3-dibromopropyl) ether of tetrabromobisphenol A (PE68).
FR-4 is ammonium polyphosphate/synergist blend, HOSTAFLAM® AP750.
FR-5 is decabromodiphenyl oxide, SAYTEX® 102E.
FR-6 is ethylene bis-(tetrabromophthalimide), (SAYTEX® BT-93).
FR-7 is melamine phosphate, MELAPUR® P 46.
FR-8 is ammonium polyphosphate, EXOLIT® AP752.

EXAMPLE 1

Molding grade polypropylene is dry blended with the test additives and then melt compounded at 425° F. (218° C.). Base stabilization is 500 ppm N,N-di(alkyl)hydroxylamine produced by the direct oxidation of N,N-di(hydrogenated tallow)amine (Irgastab® FS-042) and 500 ppm calcium stearate. Plaques (125 mil) are prepared by injection molding from the formulations using a Boy Injection Molder at 475° F. (246° C.). The specimens are tested for flame retardancy according to the UL-94 vertical burn test specifications. The results are shown below.

The plaques are tested for flame retardancy by the UL 94V thick section test. The time in seconds for the plaques to extinguish after the insult flame is removed is reported as "After Flame". The time in seconds that the plaques glow after the flame incurred from the second insult flame is extinguished is reported as "Afterglow". Efficacy as a flame retardant is demonstrated when low After Flame times are observed relative to a blank sample containing no flame retardant. The average time for 5 samples is reported in the table below. Additive levels are reported in weight percent based on polymer.

| Formulation | Additive | 1st After-flame | 2nd After-flame | After-glow |
|---|---|---|---|---|
| 1 (control) | none | >100 | xxx | xxx |
| 2 | 15% DBDPO 3% Sb₂O₃ | 11.6 | 8.2 | 0.0 |
| 3 | 10% DBDPO | 30.8 | 22.1 | 0.0 |
| 4 | 5% DBDPO | >100 | xxx | xxx |
| 5 | 5% DBDPO 0.25% NOH-1 | 14.4 | 48.7 | 0.0 |

The entry "xxx" means that the sample is completely consumed and could not be reignited.
DBDPO at the 5% level does not provide adequate flame retardancy. However, when this level of DBDPO is augmented with only 0.25% NOH-1, the flame retardancy is greatly improved.

These data show that decabromodiphenyl oxide can be replaced with a small amount of an instant hydroxylamine stabilizer in order to achieve good flame retardancy.

EXAMPLE 2

Polyethylene fibers are prepared from fiber grade polyethylene by dry blending with test additives and melt compounding at 400° F. Fibers are extruded from this formulation using a Hills laboratory scale fiber extruder. Socks are knitted from the fibers and are tested for flame retardancy according to NFPA 701 vertical burn method. Polyethylene fibers contain an additive of present components (a)-(j) in combination with a classic brominated flame retardant decabromodiphenyl oxide (DBDPO); bis(2,3-dibromopropyl) ether of tetrabromobis phenol A (PE68); or ethylene bis-tetrabromophthalimide (SAYTEX® BT-93). These formulated fibers are tested for flame retardancy according to NFPA 701.

The fibers containing both an additive of components (a)-(j) of the present invention and a classic brominated flame retardant exhibit enhanced flame retardancy compared to the classic flame retardant alone.

EXAMPLE 3

Polyethylene (LDPE) is melt compounded on a twin screw extruder at 450° F. (232° C.) with an additive of present components (a)-(j) in combination with a classic brominated flame retardant decabromodiphenyl oxide (DBDPO); bis(2,3-dibromopropyl) ether of tetrabromobis phenol A (PE68); or ethylene bis-tetrabromophthalimide (SAYTEX® BT-93). 125 mil plaques are compression molded at 400° F. (204° C.).

The plaques are tested for flame retardancy by the UL 94V thick section test.

The plaques containing both an additive of components (a)-(j) of the present invention and a classic brominated flame retardant exhibit enhanced flame retardancy compared to the classic flame retardant alone.

EXAMPLE 4

Foam grade polyethylene is dry blended with test additives and then melt compounded into pellets. The pelletized fully formulated resin is then blown into foam.

The polyethylene foam prepared contains an instant additive of components (a)-(j) in combination with a classic brominated flame retardant. The formulated foam is tested for flame retardancy according to the UL-94 burn test method.

The foam containing both an additive of present components (a)-(j) and a classic brominated flame retardant exhibits enhanced flame retardancy compared to foam containing the classic halogenated flame retardant alone.

EXAMPLE 5

Wire & cable grade polyethylene is dry blended with test additives and then melt compounded into pellets. The pelletized fully formulated resin is then extruded onto wire.

Test specimens are tested for flame retardancy using the ASTM D 2633-82 burn test conditions. The formulations containing both a compound of the present invention selected from components (a)-(j) and a classic brominated flame retardant exhibits enhanced flame retardancy compared to the classic halogenated flame retardant alone.

EXAMPLE 6

Fiber grade polyethylene is dry-blended with test additives. In addition to a compound of present components (a)-(j), selected brominated flame retardants are also included in the various formulations. Non-woven fabrics are produced from the polymer blend formulations by a spun-bonded or melt-blown process.

The non-woven fabrics made thereby are tested for flame retardancy according to the NFPA 701 vertical burn test specifications. The fabrics containing the present compounds of components (a)-(j) and selected brominated flame retardants exhibit flame retardancy.

EXAMPLE 7

Fiber grade polypropylene is dry-blended with test additives. In addition to a present compound of components (a)-(j), selected brominated flame retardants are also included in the various formulations. Non-woven fabrics are produced from the polymer blend formulations by a spun-bonded or melt-blown process.

The non-woven fabrics made thereby are tested for flame retardancy according to the NFPA 701 vertical burn test specifications. The fabrics containing an additive selected from present components (a)-(j) and selected brominated flame retardants exhibit flame retardancy.

EXAMPLE 8

Molding grade polystyrene is dry-blended with test additives and then melt compounded. In addition to an additive selected from present components (a)-(j), selected brominated flame retardants are also included in the test formulations. Specimens are injection molded from these test formulations.

The specimens are tested for flame retardancy according to the UL-94 burn test specifications. The molded specimens containing the present compounds of components (a)-(j) and selected brominated flame retardants exhibit flame retardancy.

EXAMPLE 9

Foam grade polystyrene is dry-blended with test additives and then melt compounded. In addition to an additive selected from present components (a)-(j), selected brominated flame retardants are also included in these test formulations. Foam polystyrene specimens are prepared from these test formulations.

The specimens are tested for flame retardancy according to the UL-94 burn test specifications. The foam specimens containing the present compounds selected from components (a)-(j) and brominated flame retardants exhibit flame retardancy.

EXAMPLE 10

Molding grade ABS is dry blended with the an additive selected from present components (a)-(j) and selected brominated flame retardants, then melt compounded at 425° F. (218° C.). Specimens 125 mil (⅛") thick are then injection molded from this formulation using a Boy Injection Molder at 450° F. (232° C.). The specimens are tested for flame retardancy according to the UL-94 vertical burn test specifications.

The specimens containing the present compounds selected from components (a)-(j) and brominated flame retardants exhibit flame retardancy.

EXAMPLE 11

Fiber grade polypropylene is dry blended with an additive selected from the present components (a)-(j) and a select brominated flame retardant and then melt compounded at 234° C. (450° F.) into pellets. The pelletized fully formulated resin is then spun at 246° C. (475° F.) into fiber using a Hills laboratory model fiber extruder. The spun tow of 41 filaments is stretched at a ratio of 1:3.2 to give a final denier of 615/41.

Socks are knitted from the stabilized polypropylene fiber on a Lawson-Hemphill Analysis Knitter and tested under NFPA 701 vertical burn procedure. The time in seconds for the knitted sock to extinguish after the insult flame is removed is reported as "After Flame". Both the maximum time for any one replicate and the total time for ten replicates are measured. Efficacy as a flame retardant is demonstrated when low After Flame times are observed relative to a blank sample containing no flame retardant.

The specimens containing the present compounds selected from components (a)-(j) and brominated flame retardants exhibit flame retardancy.

EXAMPLE 12

Film grade polyethylene is dry blended with the with an additive selected from the present components (a)-(j) and a select brominated flame retardant and then melt compounded into pellets. The pelletized fully formulated resin is then blown at 205° C. using a MPM Superior Blown film extruder.

The films are tested for flame retardancy under NFPA 701 test conditions. The specimens containing the present compounds selected from components (a)-(j) and brominated flame retardants exhibit flame retardancy.

Film grade polypropylene is handled in a similar fashion and polypropylene films containing the instant compounds and brominated flame retardants also show flame retardancy.

EXAMPLE 13

Molded test specimens are prepared by injection molding thermoplastic olefin (TPO) pellets containing a present test compound selected from components (a)-(j) and a select brominated flame retardant. The TPO formulations may also contain a pigment, a phosphite, a phenolic antioxidant or hydroxylamine, a metal stearate, a UV absorber or a hindered amine stabilizer or a mixture of hindered amine and UV absorber.

Pigmented TPO formulation composed of polypropylene blended with a rubber modifier where the rubber modifier is an in-situ reacted copolymer or blended product containing copolymers of propylene and ethylene with or without a ternary component such as ethylidene norbornene are stabilized with a base stabilization system consisting of an N,N-dialkylhydroxylamine or a mixture of hindered phenolic antioxidant and an organophosphorus compound.

The TPO plaques are tested for flame retardancy using the UL-94 Vertical Burn conditions. A minimum of three replicates are tested. Efficacy as a flame retardant is measured relative to a blank sample containing no flame retardant.

The specimens containing the present compounds selected from components (a)-(j) and brominated flame retardants exhibit flame retardancy.

EXAMPLE 14

Film grade ethylene/vinyl acetate (EVA) copolymers containing 20 weight percent or less of vinyl acetate are dry blended with test additives and then melt compounded into pellets. The pelletized fully formulated resin is then blown into a film at 205° C. using a MPM Superior Blown-film extruder.

The films are tested for flame retardancy under NFPA 701 test conditions. The films containing the present compounds selected from components (a)-(j) and brominated flame retardants exhibit flame retardancy.

Film grade low density polyethylene (LDPE) which contains some linear low density polyethylene (LLDPE) and/or ethylene/vinyl acetate (EVA) are dry blended with test additives and blown into film as described above for EVA copolymer resin. The films are tested for flame retardancy under NFPA 701 test conditions and those containing the present compounds selected from components (a)-(j) and brominated flame retardants exhibit flame retardancy.

EXAMPLE 15

High impact polystyrene (HIPS) polymer (STYRON® 484C, Dow Chemical Co.) is compounded with a present compound of components (a)-(j) and a select brominated flame retardant, pelletized and then injection or compression molded into plaques. These plaques are tested for flame retardant efficacy using cone calorimetry, LOI or UL-94 test method.

The plaques containing an instant compound of component (a)-(j) and a select brominated flame retardant exhibit flame retardancy. Flame retardant HIPS polymers find application in housings for business machines.

EXAMPLE 16

This Example shows the efficacy of the present compounds in PVC formulations. Such formulations are useful in flexible or rigid PVC and in wire and cable applications.

Typical formulations are seen below:

| Component | parts | parts | parts | parts |
|---|---|---|---|---|
| PVC resin | 100 | 100 | 100 | 100 |
| tin mercaptide | 1.5 | — | 2.0 | — |
| tin carboxyate | — | 2.5 | — | 2.0 |
| process aid | 1.5 | 1.5 | 2.0 | 2.0 |
| impact mod. | 6.0 | 6.0 | 7.0 | 7.0 |
| paraffin wax | 1.0 | 0.3 | 1.0 | 1.0 |
| polyethyl wax | 0.1 | 0.1 | 0.2 | 0.2 |
| Ca stearate | 1.0 | — | 0.8 | — |
| pigment | 1.0 | 0.9 | 5.0 | 5.0 |

Fully formulated PVC containing the present compounds of components (a)-(j) and a known organic or inorganic flame retardant is pelletized and then injection molded into test plaques for examination of flame retardancy using the UL-94 or LOI test method.

The PVC plaques containing the instant compounds of components (a)-(j) and a classic organic or inorganic flame retardant demonstrate flame retardancy.

EXAMPLE 17

Fiber grade poly(ethylene terephthalate) (PET) is dry blended with test additives of components (a)-(j) and a classic flame retardant, then melt compounded at 550° F. and then pelletized. The polyester pellets are dried at 175° F. for 24 hours under vacuum. The dried pellets are extruded into fibers using a Hills laboratory scale fiber extruder at 550° F. Socks are knitted from these fibers and tested for flame retardancy according to NFPA 701 test method.

The fibers containing both a present compound of components (a)-(j) and a classic halogenated or phosphorus flame retardant exhibit enhanced flame retardancy compared to the classic flame retardant alone.

EXAMPLE 18

Thermoplastic resins including polypropylene, polyethylene homopolymer, polyolefin copolymer or thermoplastic olefins (TPO), high impact polystyrene (HIPS) and ABS are dry blended with the instant compounds of components (a)-(j) and a classic organic or inorganic flame retardant and then melt compounded into pellets. The pelletized fully formulated resin is then processed into a useful article such as extrusion into fiber; blown or cast extrusion into film; blow molded into bottles; injection molded into molded articles, thermoformed into molded articles, extruded into wire and cable housing or rotation molded into hollow articles.

The articles containing the instant compounds of components (a)-(j) and a known organic or inorganic flame retardant exhibit flame retardancy when tested by a known standard test method.

Polyethylene wire and cable applications are tested for flame retardancy according to ASTM D-2633-82 burn test method. The materials containing the instant compounds of components (a)-(j) and a known organic or inorganic flame retardant show flame retardancy.

EXAMPLE 19

Articles prepared according to Example 18 which additionally contain an organophosphorus stabilizer selected from the group consisting of tris(2,4-di-tert-butylphenyl) phosphite, bis(2,4-di-tert-butyl-6-methylphenyl) ethyl phosphite, 2,2',2''-nitrilo[triethyl-tris-(3,3',5,5'-tetra-tert-butyl-1,1'-biphenyl-2,2'-diyl) phosphite], tetrakis(2,4-di-butylphenyl) 4,4'-biphenylenediphosphonite, tris(nonylphenyl) phosphite, bis(2,4-di-tert-butylphenyl) pentaerythrityl diphosphite, 2,2'-ethylidenebis(2,4-di-tert-butylphenyl) fluorophosphite and 2-butyl-2-ethylpropan-1,3-diyl 2,4,6-tri-tert-butylphenyl phosphate exhibit good flame retardancy properties.

EXAMPLE 20

Articles prepared according to Example 18 which additionally contain a o-hydroxy-phenyl-2H-benzotriazole, a hydroxyphenyl benzophenone or a o-hydroxyphenyl-s-triazine UV absorber selected from the group consisting of 2-(2-hydroxy-3,5-di-α-cumylphenyl)-2H-benzotriazole, 2-(2-hydroxy-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-α-cumyl-5-tert-octylphenyl)-2H-benzotriazole, 2,4-di-tert-butylphenyl 3,5-di-tert-butyl-4-hydroxybenzoate, 2-hydroxy-4-n-octyloxybenzophenone and 2,4-bis(2,4-dimethy-phenyl)-6-(2-hydroxy-4-octyloxyphenyl)-s-triazine exhibit good flame retardancy.

EXAMPLE 21

Articles prepared according to Example 18 which additionally contain a o-hydroxy-phenyl-2H-benzotriazole, a hydroxyphenyl benzophenone or a o-hydroxyphenyl-s-triazine UV absorber selected from the group consisting of 2-(2-hydroxy-3,5-di-α-cumylphenyl)-2H-benzotriazole, 2-(2-hydroxy-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-α-cumyl-5-tert-octylphenyl)-2H-benzotriazole, 2,4-di-tert-butylphenyl 3,5-di-tert-butyl-4-hydroxybenzoate, 2-hydroxy-4-n-octyloxybenzophenone and 2,4-bis(2,4-dimethy-phenyl)-6-(2-hydroxy-4-octyloxyphenyl)-s-triazine exhibit good flame retardancy properties.

EXAMPLE 22

Examples 1-21 are repeated where the compound of components (a)-(j) is selected from
(a) bis(1-oxyl-2,2,6,6-tetramethylpiperidin-4-yl) sebacate, 4-hydroxy-1-oxyl-2,2,6,6-tetramethylpiperidine,
(b) an N,N-di(alkyl)hydroxylamine produced by the direct oxidation of N,N-di(hydrogenated tallow)amine (Irgastab® FS-042),
(c) N-octadecyl-α-heptadecyinitrone,
(d) O-n-propyl-N,N-dioctadecylhydroxylamine,
(e) Genox™ EP, a di($C_{16}$-$C_{18}$)alkyl methyl amine oxide, CAS# 204933-93-7,
(f) 3-(3,4-dimethylphenyl)-5,7-di-tert-butyl-benzofuran-2-one, Irganox® HP-136, (BF1),
(g) tris(2,4-di-tert-butylphenyl) phosphate (Irgafos® 168),
(h) 2,6-di-tert-butyl-4-benzylidene-cyclohexa-2,5-dienone (Prostab™ 6007) and
(j) the monoacrylate ester of 2,2'-methylenebis(6-tert-butyl-4-methylphenol), Irganox® 3052.

Formulations containing an instant stabilizer of components (a)-(j) and a brominated flame retardant achieve good flame retardancy.

EXAMPLE 23

Examples 1-22 are repeated where the classic flame retardant is a flame retardant such as bis(2,3-dibromopropyl) ether of bisphenol A (PE68), tris[3-bromo-2,2,-bis(bromo-methyl) propyl] phosphate (PB370), ethylene bis-tetrabromophthalimide (SAYTEX BT-93) or ethylene bis-dibromonorbornanedicarboximide (SAYTEX BN-451). Other formulations may contain antimony trioxide in addition to brominated flame retardants. Other formulations may contain phosphorus based flame retardants such as ethylenediamine diphosphate (EDAP) or ammonium polyphosphate (APP) instead of a brominated flame retardant.

The samples containing the present compounds selected from components (a)-(j) and classic flame retardants exhibit flame retardancy.

EXAMPLE 24

Example 1 is repeated with the test additives of the table below. Additive levels are reported in weight percent based on polymer. The average of 2 or 3 samples are reported.

| Formulation | Additive | $1^{st}$ After-flame | $2^{nd}$ After-flame |
| --- | --- | --- | --- |
| 1 (control) | none | burns | xxx |
| 6 | 1% NO•1 | 0 | burns |
| 7 | 1% NOH-1 | 1.2 | burns |
| 8 | 1% NOR-1 | burns | xxx |
| 9 | 3% FR-1 | 0 | burns |
| 10 | 4% FR-1 | 0 | burns |
| 11 | 5% DBDPO | 2.2 | burns |
| 12 | 6% DBDPO | 2.1 | burns |
| 13 | 3% FR-1 1% NOR-1 | 0 | 50.5 |
| 14 | 5% DBDPO 1% NO•1 | 0.2 | 6.8 |
| 15 | 5% DBDPO 1% NOH-1 | 0.4 | 19.5 |

The entry "xxx" means that the sample is completely consumed and could not be reignited.
"Burns" means the plaque burned entirely to the clamp.
NOR-1 is ($H_{37}C_{18}$)$_2$NOCH$_2$CH$_2$CH$_3$.
It is clear that combinations of nitroxyl stabilizers, hydroxylamine stabilizers or substituted hydroxylamine stabilizers with conventional flame retardants are synergistic towards providing flame retardancy to plastic substrates.

What is claimed is:

1. A flame retardant composition which comprises
(A) a polymer substrate, and
(B) an effective flame retarding amount of a synergistic mixture of
   (i.) at least one compound selected from the group consisting of
      (b) hydroxylamine stabilizers and
   (ii.) at least one compound selected from the group consisting of brominated flame retardants, where the hydroxylamine stabilizers contain one or more groups of formula (II)

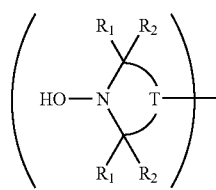

wherein T is a group forming a five- or six-membered ring; and $R_1$ and $R_2$ are independently hydrogen, alkyl of 1 to 4 carbon atoms or phenyl.

2. A composition according to claim 1 wherein component (i.) is at least one compound selected from the group consisting of
hydroxylamine stabilizers of the formula

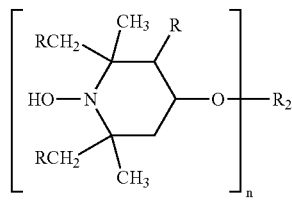

where
R is hydrogen or methyl,
n is 1 or 2,
when n is 1,
$R_2$ is hydrogen, $C_1$-$C_{18}$alkyl optionally interrupted by one or more oxygen atoms, cyanoethyl, benzyl, glycidyl, a monovalent acyl radical of an aliphatic, cycloaliphatic, araliphatic or aromatic carboxylic acid, or of a carbamic acid or of a phosphorus-containing acid, or a monovalent silyl radical or
when n is 2,
$R_2$ is $C_1$-$C_{12}$alkylene, $C_4$-$C_{12}$alkenylene, xylylene, a divalent acyl radical of an aliphatic, cycloaliphatic, araliphatic or aromatic dicarboxylic acid, of a dicarbamic acid or of a phosphorus-containing acid, or a bivalent silyl radical.

3. A composition according to claim 2 wherein component (i.) is bis(1-hydroxy-2,2,6,6-tetramethvlpiperidin-4-yl) sebacate.

4. A composition according to claim 1 in which component (ii.) of the synergistic mixture (B) is at least one compound selected from the group consisting of
polybrominated diphenyl oxide,
decabromodiphenyl oxide,
tris[3-bromo-2,2-bis(bromomethyl)propyl] phosphate,
bis(2,3-dibromopropyl ether) of bisphenol A,
brominated epoxy resin, ethylene-bis(tetrabromophthalimide),
1,2-bis(tribromophenoxy)ethane,
tetrabromo-bisphenol A,
ethylene bis-(dibromo-norbornanedicarboximide).

5. A composition according to claim 1 in which component (i.) of the synergistic mixture (B) is bis(1-hydroxy-2,2,6,6-tetramethvlpiperidin-4-yl) sebacate and
component (ii.) of the synergistic mixture (B) is at least one compound selected from the group consisting of
polybrominated diphenyl oxide,
decabromodiphenyl oxide,
bis(2,3-dibromopropyl ether) of bisphenol A,
brominated epoxy resin,
ethylene-bis(tetrabromophthalimide),
1,2-bis(tribromophenoxy)ethane and tetrabromo-bisphenol A.

6. A composition according to claim 1 in which component (ii.) of the synergistic mixture (B) is the flame retardant decabromodiphenyl oxide.

7. A composition according to claim 1 wherein of the synergistic mixture (B), component (i.) is present from 0.25 to 10% by weight, based on component (A); and component (ii.) is present from 0.25 to 60% by weight, based on component (A).

8. A composition according to claim 1 further comprising a UV absorber.

9. A composition according to claim 8 comprising a UV absorber selected from the group consisting of 2-(2-hydroxy-3,5-di-α-cumylphenyl)-2H-benzotriazole, 2-(2-hydroxy-5-methylphenyl)-2H- benzotriazole, 5-chloro-2-(2-hydroxy-3,5-d i-tert-butylphenyl)-2H-benzotriazole, 2-(2-hyd roxy-3,5-d tert-amylphenyl)-2H-benzotriazole, 2-(2-hydroxy-3-α-cumyl-5-tert-octylphenyl)-2H-benzotriazole, 2,4- di-tert-butyiphenyl 3,5-di-tert-butyl-4-hydroxybenzoate, 2-hydroxy-4-n-octyloxybenzophenone and 2,4- bis(2,4-dimethyphenyl )-6-(2-hyd roxy-4-octyloxyphenyl)-s-triazine.

10. A composition according to claim 1 wherein the polymer substrate (A) is selected from the group of resins consisting of the polyolefins, the thermoplastic olefins, styrenic polymers and copolymers.

11. A composition according to claim 10 wherein the polymer substrate (A) is selected from the group consisting of polypropylene, polyethylene, thermoplastic olefin, acrylnitrile/butadiene/styrene copolymer and high impact polystyrene.

12. A composition according to claim 1 wherein component (i.) of the synergistic mixture (B) is present in an amount from 5.1 to 10% by weight based on the polymer substrate (A).

13. A composition according to claim 5 in which component (ii.) of the synergistic mixture (B) is the flame retardant or decabromodiphenyl oxide.

* * * * *